Feb. 19, 1929.
O. W. SLEFFEL
1,702,707
BERMUDA GRASS CUTTER
Filed March 30, 1927
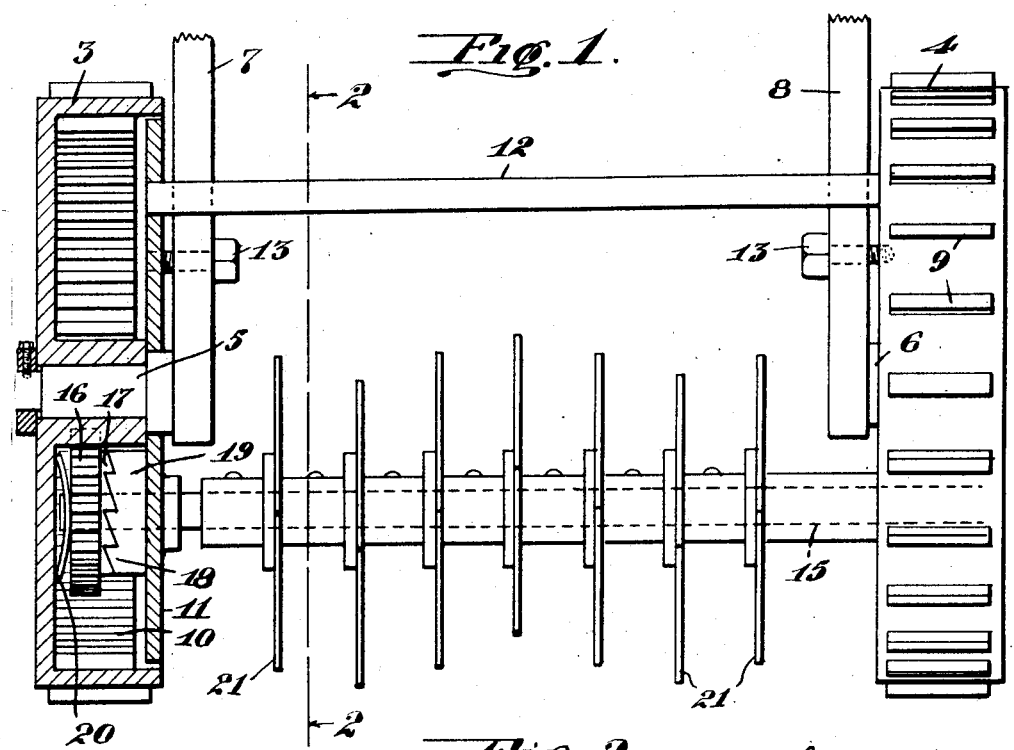
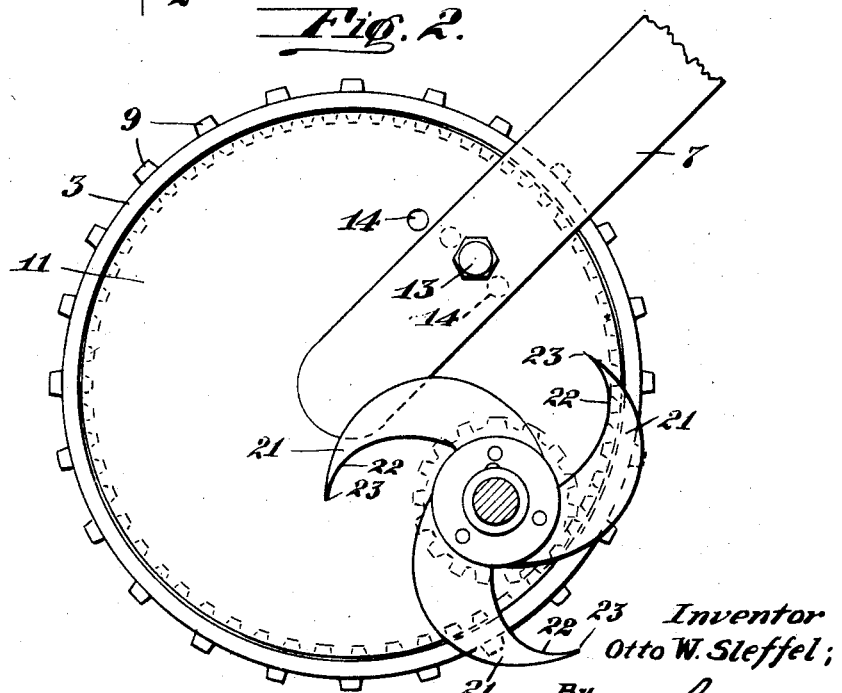
Inventor
Otto W. Sleffel;
By N. W. Crandall
Atty.

Patented Feb. 19, 1929.

1,702,707

UNITED STATES PATENT OFFICE.

OTTO W. SLEFFEL, OF LOS ANGELES, CALIFORNIA.

BERMUDA-GRASS CUTTER.

Application filed March 30, 1927. Serial No. 179,561.

This invention relates to a mechanism for cutting Bermuda grass and other growths of vine-like character which lie close to the ground.

An object of the invention is to provide a cutter adapted to advance over the ground in a manner common to lawn mowers and when so advanced effect operation of a series of vertically disposed cutters, and in which the cutters are so formed and arranged as to advance beneath the Bermuda grass and effect severance thereof by a cutting action directed upwardly.

Another object is to provide a cutter of the above character in which the cutting blades are so disposed relatively to the traction wheels that the forces imposed on the cutters in effecting a severing action will exert a downward pull on the traction wheels in such manner as to increase the traction of the wheels.

Another object is to provide an arrangement of a series of cutters whereby adjacent cutters will effect their cutting action successively so as to minimize the work imposed on the mechanism at one time.

A further object is to provide a cutter of the above type which is simple in construction and efficient in operation.

With the foregoing objects in view together with such other objects and advantages as may subsequently appear, the invention resides in the novel features and in the parts, construction, combination and arrangement of parts hereinafter described and claimed, and illustrated by way of example in the accompanying drawings in which:

Fig. 1 is a view of the cutter as seen in front elevation with portions shown in vertical section;

Fig. 2 is a view in section and elevation as seen on the line 2—2 of Fig. 1.

Referring to the drawings more specifically, 3 and 4 indicate a pair of spaced traction wheels which are revolubly mounted on trunnions 5 and 6 carried by the side members 7 and 8 of the yoke on a handle of the character common in lawn mowers. The wheels 3 and 4 are provided on their outer peripheries with cleats 9 and are formed on their inner peripheries with gear teeth 10. Supported on the trunnions 5 and 6 are plates 11 which enclose the inner sides of the wheels 3 and 4 which plates are connected together by a tie rod 12 and which plates are attached to the yoke members 7 and 8 by means of bolts 13 which pass through the members 7 and 8 and are screwed into engagement with any one of a series of threaded holes or depressions 14 formed in the plates 11. Extending between the wheels 3 and 4 and journalled in the plates 11 is a revoluble shaft 15 arranged on a plane below the axes of the trunnions 5 and 6 and also disposed on a vertical plane extending rearwardly of the axes of the trunnions. The shaft 15 is designed to be driven on advancing the wheels 3 and 4 forwardly over the ground in a manner common in lawn mowers, for which purpose a pinion 16 is mounted for free rotation on an end portion of the shaft 15 which pinion is formed with ratchet teeth 17 which engage corresponding teeth 18 on a collar 19 affixed to the shaft 15. A spring 20 bears between the side wall of a wheel and the pinion 16 to normally maintain the ratchet teeth 17 and 18 in inter-engagement and yet permit the pinion 16 to move outwardly on the shaft 15 so that the teeth 17 will ride over the teeth 18 on retrograde movement of the wheels 3 and 4. The pinion 16 meshes with the internal gear teeth 10 on one of the traction wheels so that as the wheels revolve the pinion 16 will turn therewith in a corresponding direction.

Mounted on the shaft 15 is a series of cutters each of which embodies a plurality of hook-shaped blades 21 having curved cutting edges 22 on their inner margins leading to points 23 at the outer ends of the blades.

In the operation of the invention, advancing the wheels 3 and 4 forwardly over the ground thereby revolving the wheels, effects driving of the shaft 15 through the pinion 16 and the clutch formed by the ratchet teeth 17 and 18. The cutters will then be rotated in a direction corresponding to the direction of rotation of the traction wheels so that the hook-shaped blades will advance downwardly toward the ground and rearwardly and upwardly whereby the curved cutting edges thereof will pass beneath the Bermuda grass and effect severance thereof on the upward movement or stroke of the blades. The resistance offered to the cutting actions of the blades will exert a downward pull on the wheels 3 and 4 thereby increasing the traction thereof. The relation of the blades to the ground surface is controlled by raising or lowering the yoke which turns the plates 11 carrying the shaft 15 and thereby raises or lowers the latter relatively to the axes of the trunnions 5 and 6. The connection between the yoke and the plates 11 afforded by the bolts 13 and the series of threaded recesses 14, afford a means for varying the inclination of the yoke and its handle relatively to the ground so that when the cutter is disposed with the blades seating on the ground, the outer end of the handle may be positioned convenient to the reach of the operator.

As a means for minimizing the work imposed on the cutter at any one time, the adjacent cutters are disposed with their blades offset relatively to each other, so that adjacent cutters will generally effect their cutting action successively and not simultaneously.

While I have shown and described a specific embodiment of my invention, I do not limit myself to the exact details of construction and arrangement shown, but may employ such modifications, equivalents and changes in construction and arrangement as come within the meaning and scope of the appended claims.

I claim:

1. In a device of the character described, a pair of spaced traction wheels, a sole rotary shaft extending between said wheels the axis of which extends on a plane below and rearward of the axes of said wheels, a series of vertically extending cutting blades, and means for driving said shaft from said traction wheels; said cutting blades being formed in the shape of a sickle to effect a cutting action on the upward stroke thereof and being operable by resistance to the cutting action thereof to effect downward pull on the traction wheels to augment the traction of the latter.

2. In a device of the character described, a pair of traction wheels, a sole shaft extending between said wheels arranged with the axis thereof disposed on a plane below and to one side of the axes of said traction wheels, a series of groups of vertically extending cutting blades on said shaft the blades in each group being aligned circumferentially of the shaft, and the blades of contiguous groups being offset relatively to each other, each of said blades being hook-shaped and having cutting edges on their inner margins and being arranged to pass beneath and engage plant runners and to independently effect a cutting action on the upstroke thereof operable to effect a downward pull on said traction wheels, and means for driving said shaft from said traction wheels.

3. In a device of the character described, a pair of traction wheels, trunnions on which said wheels are turnable, yoke members carrying said trunnions, connected plates on said trunnions affixed to said yoke members, a rotary shaft extending between said wheels the axis of which is disposed below and to one side of the axes of said wheels, said shaft being carried by said plates, a series of hook-shaped cutting blades carried by said shaft, said blades being arranged with adjacent blades longitudinally of the shaft offset relatively to each other and being formed with cutting edges arranged to effect a cutting action on the upward stroke of said blades, and means for driving said shaft from said traction wheels; said shaft being operable to be raised and lowered to vary the depth of cut of said blade by rocking said plates through said yoke members.

In testimony whereof, I have affixed my signature.

OTTO W. SLEFFEL.